US011828373B2

(12) United States Patent
Ishizaki et al.

(10) Patent No.: US 11,828,373 B2
(45) Date of Patent: Nov. 28, 2023

(54) CHECK VALVE

(71) Applicant: ISHIZAKI CO., LTD., Tokyo (JP)

(72) Inventors: Nobuyuki Ishizaki, Tokyo (JP); Takeshi Ouchi, Tokyo (JP); Kazuhiro Ota, Tokyo (JP); Daisuke Kikuchi, Tokyo (JP); Kazuhiko Kojima, Tokyo (JP); Futoshi Hasegawa, Tokyo (JP); Eiji Hara, Tokyo (JP); Yusuke Yoshida, Tokyo (JP)

(73) Assignee: ISHIZAKI CO., LTD., Tokyo (JP)

( * ) Notice: Subject to any disclaimer, the term of this patent is extended or adjusted under 35 U.S.C. 154(b) by 517 days.

(21) Appl. No.: 17/058,753

(22) PCT Filed: Jan. 31, 2020

(86) PCT No.: PCT/JP2020/003755
§ 371 (c)(1),
(2) Date: Nov. 25, 2020

(87) PCT Pub. No.: WO2021/152842
PCT Pub. Date: Aug. 5, 2021

(65) Prior Publication Data
US 2022/0316612 A1 Oct. 6, 2022

(51) Int. Cl.
F16K 15/06 (2006.01)
(52) U.S. Cl.
CPC .................. F16K 15/063 (2013.01)
(58) Field of Classification Search
CPC ....... F16K 15/063; F16K 1/36; F16K 27/0209
See application file for complete search history.

(56) References Cited

U.S. PATENT DOCUMENTS 862,714 A    8/1907  Constantinov
1,703,248 A  2/1929  Rothenbucher
(Continued)

FOREIGN PATENT DOCUMENTS

CN    102927294 A    2/2013
CN    202732990 U    2/2013
(Continued)

OTHER PUBLICATIONS

The Extended European Search Report dated Sep. 2, 2022, issued in counterpart EP application No. 20786426.5.
(Continued)

Primary Examiner — Kelsey E Cary
(74) Attorney, Agent, or Firm — WHDA, LLP

(57) ABSTRACT

The check valve (1) is of straight pipe joint type and oblique lift type. It includes: a valve seat (12a); a moving body (2) capable of linearly reciprocating between a closed state where it is in close contact with the valve seat and an open state where it is separated from the valve seat; a primary flow path (inflow path (12c)) on an upstream side of the moving body; and a secondary flow path (outflow path (12d)) on a downstream side of the moving body. The moving body includes a valve body (6) and a valve shaft (7) extending from the valve body. The valve seat supporting the valve body is formed to straddle the center line (CL) of the connection flow path that linearly extends including the primary flow path (inflow path) and the secondary flow path (outflow path 12d) in a cross section including the center line thereon.

10 Claims, 9 Drawing Sheets

(56) References Cited

U.S. PATENT DOCUMENTS

| | | | | |
|---|---|---|---|---|
| 2,447,729 | A | * | 8/1948 | Bertea .................. F16K 15/063 137/533.29 |
| 2,619,115 | A | | 11/1952 | Dondero et al. |
| 6,142,037 | A | * | 11/2000 | Botosan ............. F16H 61/0276 137/543.13 |
| 2004/0036045 | A1 | | 2/2004 | Weingarten |
| 2004/0231721 | A1 | * | 11/2004 | Ackroyd ............... F16K 15/063 137/218 |
| 2005/0062000 | A1 | | 3/2005 | Bartell et al. |
| 2010/0037964 | A1 | * | 2/2010 | Nalini .................. F16K 39/022 137/505.18 |
| 2010/0078084 | A1 | * | 4/2010 | Zuck ..................... F16K 43/008 251/205 |
| 2011/0037009 | A1 | | 2/2011 | Svensson et al. |
| 2015/0122353 | A1 | | 5/2015 | Chiba |
| 2020/0149644 | A1 | | 5/2020 | Ishizaki et al. |
| 2022/0018449 | A1 | * | 1/2022 | Caty ..................... E04H 4/1645 |

FOREIGN PATENT DOCUMENTS

| | | |
|---|---|---|
| CN | 202927064 U | 5/2013 |
| CN | 203051863 U | 7/2013 |
| CN | 102537435 B | 9/2013 |
| CN | 103759050 A | 4/2014 |
| CN | 203784328 U | 8/2014 |
| CN | 104976390 A | 10/2015 |
| CN | 204729687 U | 10/2015 |
| CN | 205064949 U | 3/2016 |
| CN | 205534261 U | 8/2016 |
| CN | 205715698 U | 11/2016 |
| CN | 205715700 U | 11/2016 |
| CN | 205715715 U | 11/2016 |
| CN | 205859187 U | 1/2017 |
| CN | 206017788 U | 3/2017 |
| CN | 206496001 U | 9/2017 |
| CN | 206723474 U | 12/2017 |
| CN | 107859781 A | 3/2018 |
| CN | 207848441 U | 9/2018 |
| CN | 209067863 U | 7/2019 |
| CN | 209458430 U | 10/2019 |
| JP | 2002213629 A | 7/2002 |
| JP | 2016065572 A | 4/2016 |
| JP | 2016075356 A | 5/2016 |
| JP | 2016205616 A | 12/2016 |
| KR | 20060096535 A | 9/2006 |
| KR | 100624758 B1 | 10/2006 |
| KR | 20110073954 A | 6/2011 |
| WO | 2003038321 A2 | 5/2003 |
| WO | 2013/180108 A1 | 12/2013 |
| WO | 2016163344 A1 | 10/2016 |
| WO | 2019176850 A1 | 9/2019 |

OTHER PUBLICATIONS

International Search Report and Written Opinion in Japanese dated Mar. 24, 2020, issued in counterpart International Application No. PCT/JP2020/003755 (11 pages).

Decision to Grant a Patent dated Apr. 12, 2022, issued in counterpart JP Application No. 2020-560843, with English Translation. (5 pages).

Office Action dated Jul. 7, 2023, issued in counterpart CN Patent Application No. 202080003071.0, with English Translation. (24 pages).

* cited by examiner

CHECK VALVE

TECHNICAL FIELD

The present invention relates to a foot valve structure, and relates to a lift-type check valve.

BACKGROUND ART

There are known check valves that allow fluid in pipes to pass in one direction. There are various types of check valves that are classified according to operation aspects of valve bodies.

Of these, lift check valves have a structure in which the valve body linearly reciprocates in a direction toward or away from a valve seat, and therefore a quick closing operation is possible. In particular, Smolensky type lift check valves include a spring body so that they can suitably reduce water hammer generation.

Patent Document 1 discloses a Y-shaped check valve that is straight pipe joint type and oblique lift type. The check valve includes a valve body and a spring body that biases the valve body toward the valve seat side in a direction to push the valve body down.

With respect to the direction of straight line connecting the inflow port and the outflow port, the valve body of the check valve is lifted obliquely upward by the fluid flowing in the forward direction to be in an open state, and, when the valve body receives the fluid flowing in the opposite direction, it is pushed down by the spring body and is moved obliquely downward to be in a closed state.

CITATION LIST

Patent Document

[Patent Document 1] US Patent Application Publication No. 2005/0062000

SUMMARY OF THE INVENTION

Problem to be Solved by the Invention

As described above, when the fluid flows in the forward direction, the check valve disclosed in Patent Document 1 lifts the valve body obliquely upward with respect to the direction of straight line connecting the inflow port and outflow port, and therefore the fluid pressure in the flow path is apt to be uneven. This may generate a vortex in a part of the flow path and may increase pressure loss.

The present invention is designed with respect to the above problems, and provides a check valve capable of reducing pressure loss that occurs when a fluid flows there through.

Means for Solving the Problem

According to the present invention, there is provided a check valve of straight pipe joint type and oblique lift type, which check valve includes: a valve seat; a moving body that can linearly reciprocate between a closed state in which it closely contacts with the valve seat and an open state in which it is separated from the valve seat; a primary flow path located on an upstream side of the moving body; and a secondary flow path located on a downstream side of the moving body, wherein the moving body includes a valve body supported by the valve seat in the closed state, and a valve shaft extending from the valve body; and the valve seat is formed so that it straddles a center line of a connection flow path that connects the respective connection parts to connect to other pipe bodies to be connected, in a cross section including the center line therein.

Effect of the Invention

According to the present invention, there can be provided a check valve capable of reducing the pressure loss that occurs when a fluid flows therethrough.

DESCRIPTION OF EMBODIMENTS

Figure 1:
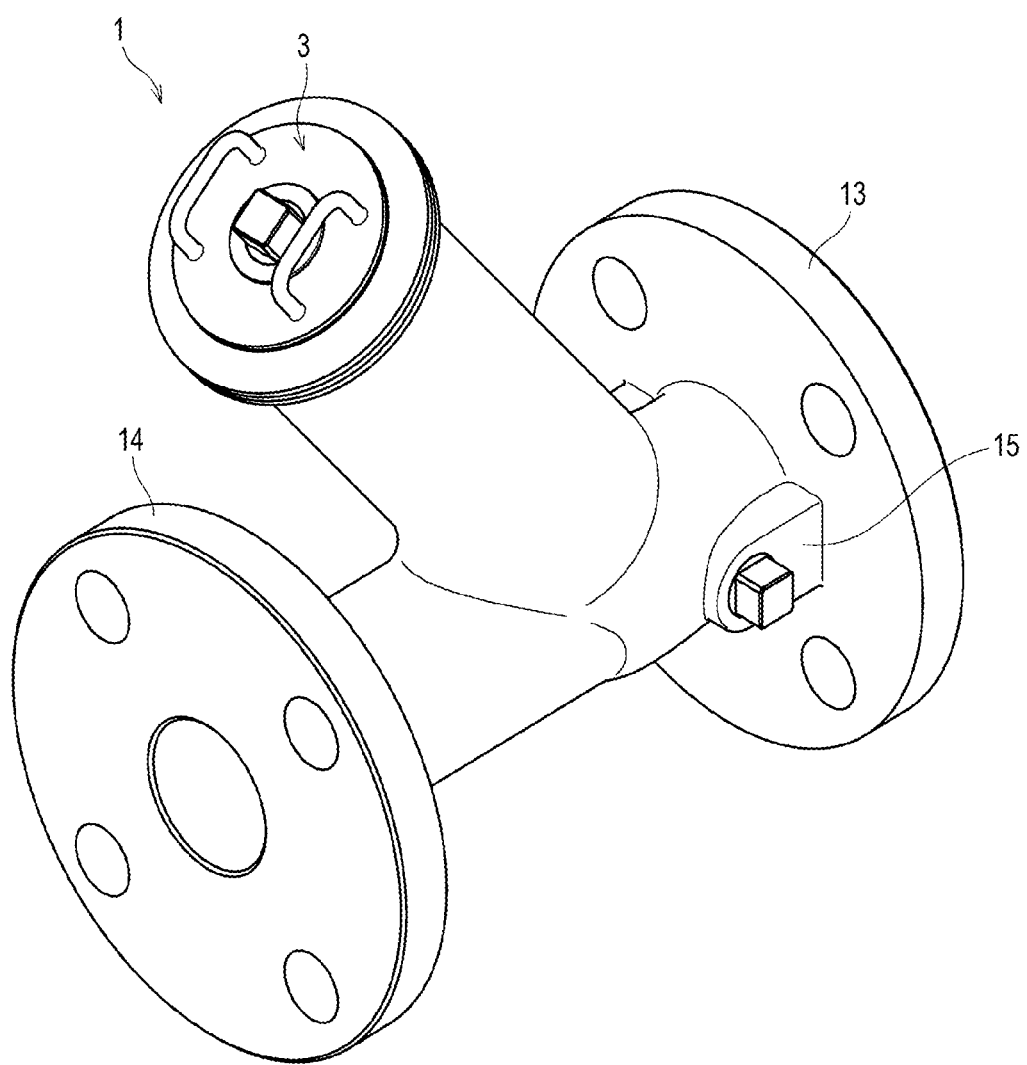
FIG. 1 is a perspective view showing an external appearance of a check valve according to a first embodiment of the present invention.

Embodiments of the present invention is described below with reference to the drawings.

Note that the embodiments described below are merely examples for facilitating the understanding of the present invention and do not limit the present invention. That is, the shapes, sizes, arrangements and the like of the members described below can be changed and improved without departing from the spirit of the present invention, and the present invention naturally includes equivalents thereof.

Further, in all the drawings, the same or similar components are denoted by the same or similar reference numerals and signs, and the duplicated description will not be repeated.

In the present specification, description may be made by defining a vertical direction, but this is set for the sake of convenience in order to explain the relative relationship of the components, and which does not specify directions in which the product according to the present invention is manufactured or used.

Ideally, the vertically upward direction is upward and the vertically downward direction is downward, but this does not limit the installation state of a check valve. "Up and down" related to the check valve is directions perpendicular to the connection flow path direction that is the direction of the flow path to which the check valve is connected. Of these directions, the direction in which a moving body separates from a valve body is upward, and the direction in which a moving body is close to the valve body is downward.

First Embodiment

<Outline of the Check Valve According to this Embodiment>

Figure 2:
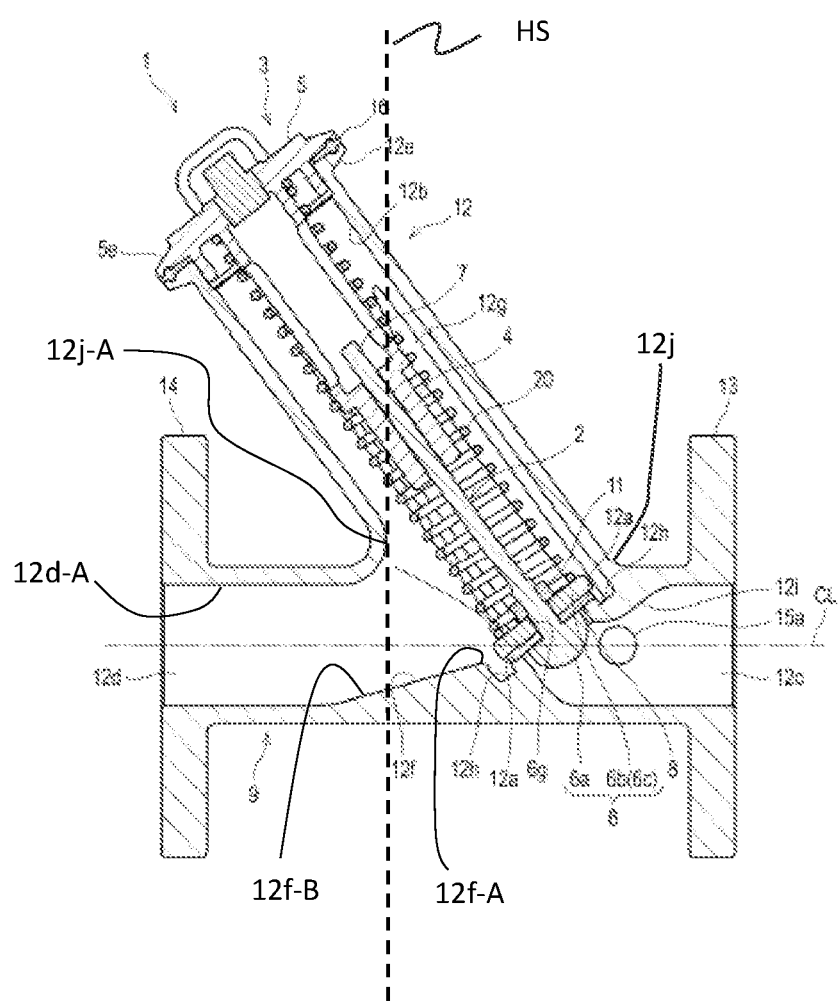
FIG. 2 is a longitudinal cross-sectional view showing a closed state of the check valve according to the first embodiment.

First, outline of a check valve 1 according to this embodiment is described mainly with reference to FIGS. 1 and 2. FIG. 1 is a perspective view showing an external appearance of a check valve 1 according to a first embodiment of the present invention, and FIG. 2 is a longitudinal cross-sectional view showing a closed state of the check valve 1 according to the first embodiment. Here, a cross section including the axis of a valve shaft 7 is referred to as a longitudinal cross section.

As shown in FIGS. 1 and 2, the check valve 1 according to this embodiment is a straight pipe joint type and oblique lift type. The check valve 1 includes a valve seat 12a, a moving body 2, a primary flow path (inflow path 12c), and a secondary flow path (outflow path 12d). The moving body 2 can linearly reciprocate between a closed state in which it closely contacts with the valve seat 12a and an open state in which it is separated from the valve seat 12a. The primary flow path (inflow path 12c) is located on the upstream side of the moving body 2. The secondary flow path (outflow path 12d) is located on the downstream side of the moving body 2.

The moving body 2 includes a valve body 6 supported by a valve seat in a closed state, and a valve shaft 7 extending from the valve body 6.

The valve seat 12a is formed such that it straddles the center line CL of a connection flow path that extends linearly including the primary flow path (inflow path 12c) and the secondary flow path (outflow path 12d) in a cross section including the center line CL thereon.

The "straight pipe joint type" is the type of the pipe joint that is connected to other pipes and has the outflow direction on extension of the inflow direction.

The "oblique lift type" is the type in which the valve body operates obliquely with respect to the straight line connecting the inflow direction and the outflow direction, and the valve body is lifted by the fluid.

In this embodiment, connection parts that connect to other pipes are collar parts 13 and 14 and are flanges, but the present invention is not limited to such a configuration, and the connection parts may be any that can be connected to other pipes. For example, the connection parts may be a part formed by a ferrule connection or a part formed by a screw connection.

In other words, "the valve seat 12a straddles the center line CL" means that the center line CL passes through the opening defined by the valve seat 12a, and a part of the valve seat 12a is below the center line CL, and the other part is above the center line CL.

Note that the valve seat 12a may be formed to straddle the center line in any one of cross sections including the center line CL.

According to the above configuration, the valve seat 12a is formed to straddle the center line CL of the connection flow path. Therefore, when valve body 6 is opened, the fluid can easily flow linearly, and turbulent flow (vortex flow) can be reduced, as compared with the valve seat that is formed not to straddle the center line CL but to be located on one side. This can reduce the pressure loss of the check valve 1 that occurs when the fluid flows therethrough.

<Configuration of Each Part>

Figure 3:
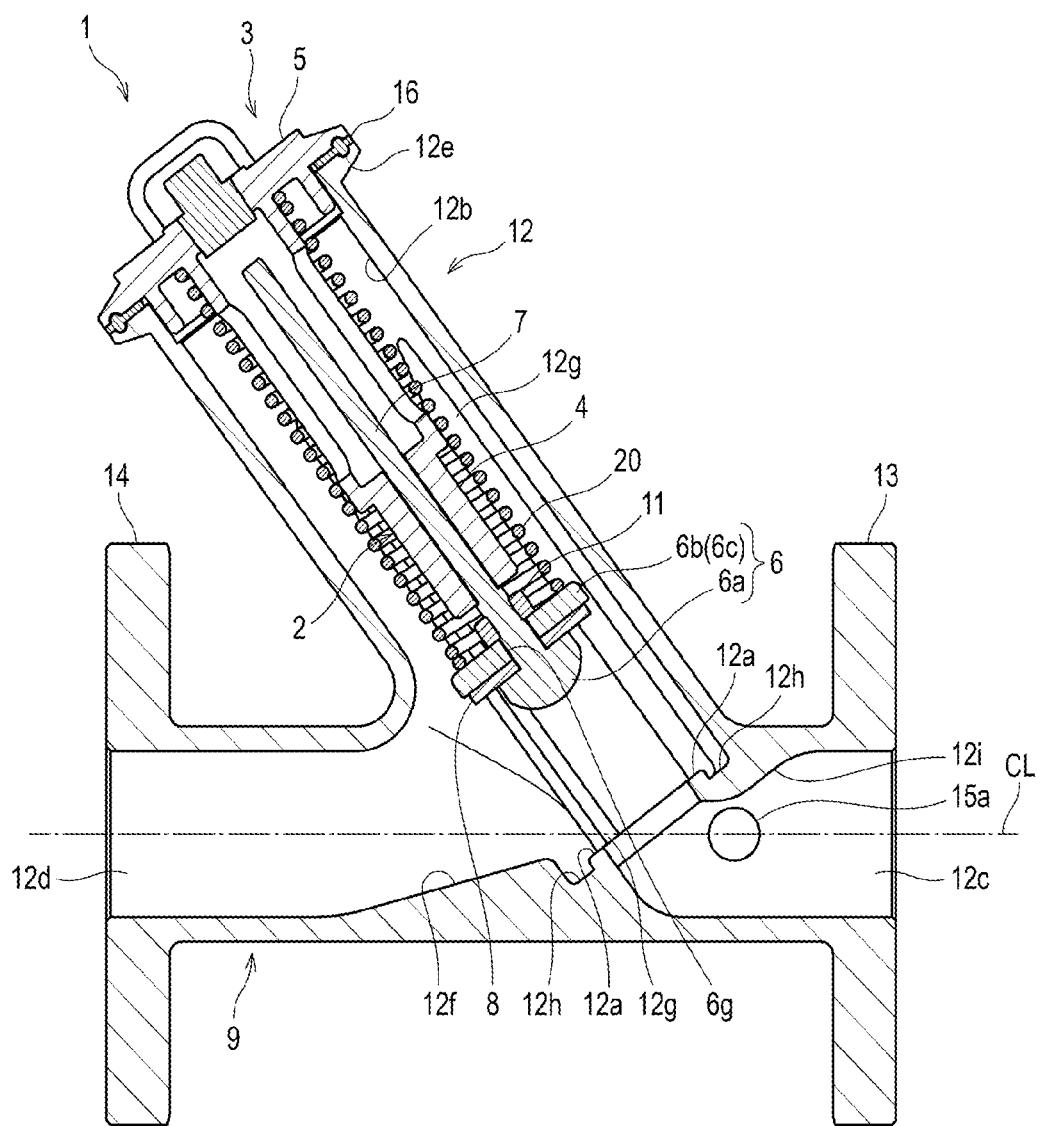
FIG. 3 is a longitudinal cross-sectional view showing an open state of the check valve according to the first embodiment.
Figure 4:
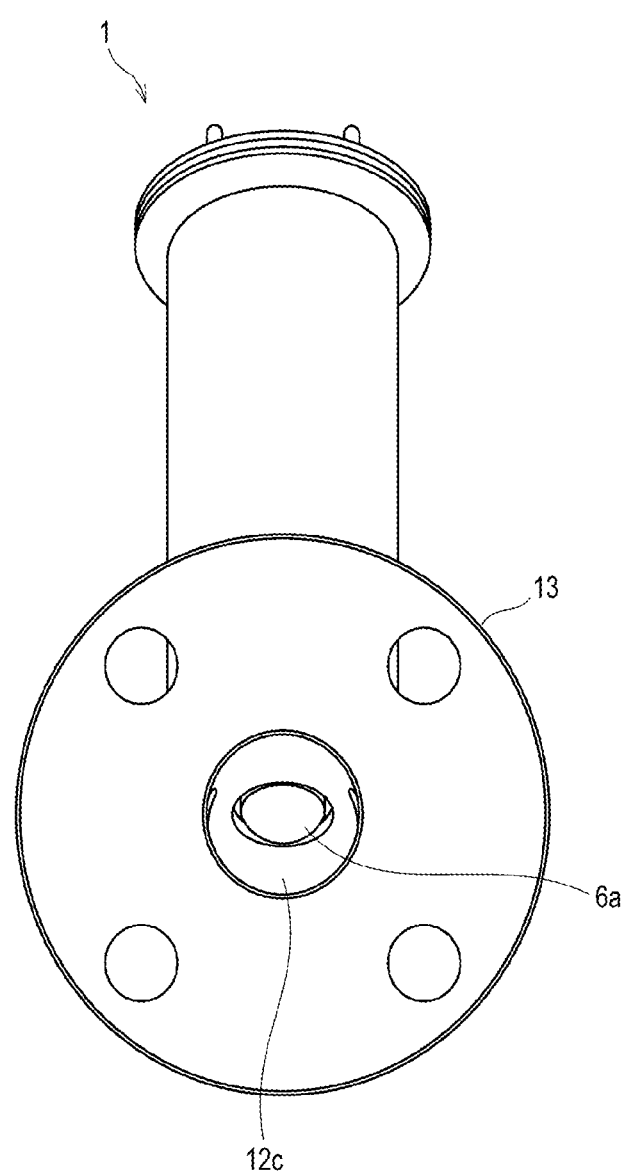
FIG. 4 is a side view of the check valve according to the first embodiment seen from the inflow path side.
Figure 5:
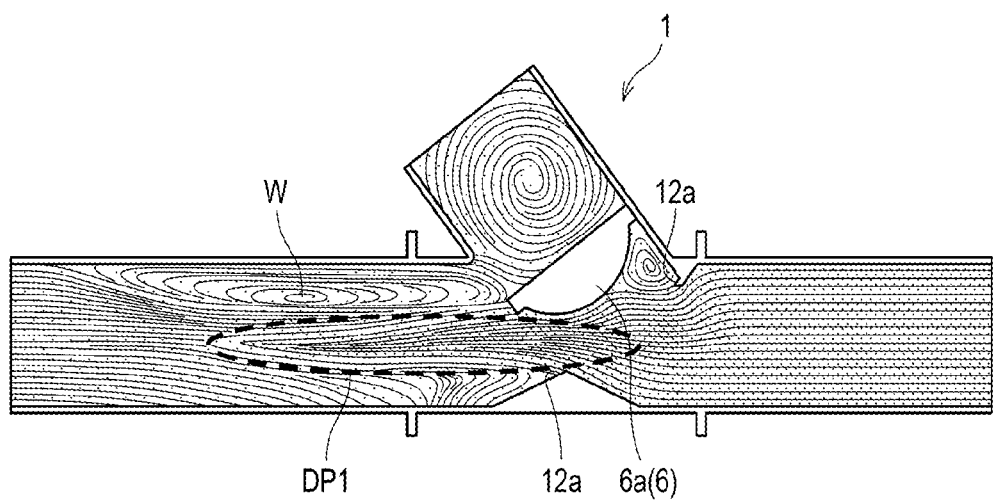
FIG. 5 is an explanatory diagram showing a dynamic pressure distribution in a flow path when a fluid flows through the check valve according to the first embodiment.

Next, the configuration of each part configuring the check valve 1 according to the first embodiment is described below with reference to FIGS. 3 to 5 in addition to FIGS. 1 and 2. FIG. 3 is a longitudinal cross-sectional view showing an open state of the check valve 1 according to the first embodiment, and FIG. 4 is a side view of the check valve 1 according to the first embodiment as seen from the inflow path 12c side. FIG. 5 is an explanatory diagram which shows a dynamic pressure distribution in the flow path when flowing the fluid into the check valve 1 according to the first embodiment. Here, FIG. 5 is an explanatory diagram where a valve body upper part 6b, a packing 8, a valve casing 12, a spring body 20 and the like are omitted and other configurations of the check valve 1 are shown in a simplified manner to mainly illustrate the dynamic pressure distribution.

The check valve 1 according to this embodiment is of straight pipe joint type and oblique lift type as described above, and has the moving body 2 including the valve body 6 that linearly and floatingly reciprocates in the direction of approaching or separating from the valve seat 12a. In particular, the check valve 1 includes the inflow path 12c and the outflow path 12d having the same center line CL. The moving body 2 floatingly reciprocates in a direction inclined to the center line CL, specifically, in a direction tilted to the outflow path 12d side.

The fluid whose backflow is restricted by the check valve 1 is a liquid such as water or a gas such as air.

In the closed state shown in FIG. 2, the valve body 6 is biased by the spring body 20 to be pressed against the valve seat 12a, and the check valve 1 of this embodiment is generally called as a Smolensky type. Therefore, due to the biasing force of the spring body 20, the check valve 1 causes the valve body 6 to come into contact with the valve seat 12a to quickly close the flow path at the moment when the flow of fluid turns into a backflow in which the fluid flows from a secondary side to a primary side. As a result, the check valve 1 can prevent backflow, reduce occurrence of water hammer, and enhance the certainty of the closed state (water stop performance).

However, the check valve 1 is not limited to the configuration in which it includes the spring body 20 to press the valve body 6 against the valve seat 12a. For example, the configuration may be such that the valve body 6 is pressed against the valve seat 12a by the dead weight of the moving body 2 alone, or by the dead weight of the moving body 2 and the load applied from the damper mechanism by the valve shaft 7 and the guide tube 4 described below.

For example, the check valve 1 of this embodiment can be used as a generally-called foot valve on the primary side of a lifting pump (not shown in the drawings), so that it can favorably prevent falling of water in the pump pipe due to the high certainty of water stop.

The check valve 1 is provided in a flow path for passing a liquid or a gas (fluid). As shown in FIG. 3, when the differential pressure between the primary side and the secondary side of the valve body 6 exceeds a predetermined minimum operating pressure (cracking pressure), the valve body 6 is in the open state to allow the fluid to flow. When the differential pressure between the primary side and the secondary side of the valve body 6 becomes negative or becomes equal to or lower than a minimum operating pressure, as shown in FIG. 2, the valve body 6 is in the closed state to block the fluid passing therethrough.

Note that the valve body 6 need not necessarily be configured to be in the fully open state shown in FIG. 3 if a desired amount of area for the fluid passing therethrough can be obtained. Although the valve body 6 is shown in the fully open state in FIG. 3, the opening degree of the valve body 6 changes depending on the flow rate due to the mass of the moving body 2 and the restoring force of the spring body 20.

The check valve 1 includes a moving body 2, a valve casing 12, a guide cap 3, and a spring body 20. The valve casing 12 accommodates at least a part of the moving body 2 on the opposite side of the valve body 6. The guide cap 3 has a guide tube 4 and is attached to the valve casing 12. The spring body 20 is provided between the valve body 6 and the guide cap 3 to bias the valve body 6 toward the primary flow path side. That is, the check valve 1 in the present specification refers to the entire pipe joint including the valve body 6 and the like therein.

(About Valve Casing and Joint Part)

A joint part 9 extends substantially linearly to form the inflow path 12c and the outflow path 12d. The valve casing 12 according to this embodiment is integrally formed with the joint part 9 by the lost wax manufacturing method, and branches from and intersects with the joint part 9. The valve casing 12 and the valve shaft 7 described below extend obliquely toward the outflow path 12d side in a direction intersecting with the flow path direction of the primary flow path (inflow path 12c) and the secondary flow path (outflow path 12d).

The joint part 9 is integrally formed with a collar part 13 on the upstream side (primary side) and a collar part 14 on the downstream side (secondary side). These collar parts are fixed to pipes (not shown in the drawings) by using tightening tools (not shown in the drawings) such as bolts and nuts. As shown in FIG. 1, the inflow path 12c side of the valve casing 12 (joint part 9) according to this embodiment has a flat mount 15 formed thereon to attach a suction pipe (not shown in the drawings) connected to a suction pump (not shown in the drawings). The mount 15 is formed with an opening for decompression 15a that penetrates to the inside of the primary flow path side of the valve casing 12.

The operator can operate the suction pump to draw the fluid from the suction pipe toward the opening for decompression 15a to make a negative pressure on the upstream side of the valve body 6 to fill with the fluid thereon. In addition, if a configuration in which a pressure sensor is attached to the opening for decompression 15a is employed, the operator also can check the pressure state inside the valve casing 12 to check whether the inside of the valve casing 12 is filled with fluid.

A guide cap 3 described below is removably attached on the termination of the portion in the valve casing 12 that extends in a direction intersecting with the center line CL of the inflow path 12c and the outflow path 12d.

(About Valve Seat)

As shown in FIG. 2 and described above, the valve seat 12a is formed so that it straddles the center line CL of the connection flow path connecting the respective connection parts (collar parts 13 and 14) for connecting to the other pipe bodies to be connected, in a cross-sectional view including the center line CL.

Further, the valve seat 12a is formed so that a part of the inner wall of the valve casing 12 projects over the entire circumference toward the flow path side (to narrow the inflow path 12c). The seat surface of the valve seat 12a is formed in an annular shape and extends perpendicularly to the reciprocating direction of the moving body 2. That is, the valve seat 12a extends in a direction intersecting with the flow path direction of the inflow path 12c and the outflow path 12d, and the extending direction of the valve shaft 7 and the valve casing 12.

An annular groove 12h is formed on the outer periphery of the valve seat 12a. The annular groove 12h is formed to be recessed toward the inflow path 12c side (the side away from the moving body 2) with respect to the seat surface of the valve seat 12a. The annular groove 12h limits the area of the valve seat 12a with which the valve body 6 of the moving body 2 is in contact to enable the valve body 6 to easily closely contact with the valve seat 12a.

The valve seat 12a extends in a direction intersecting with the flow path direction of the primary flow path (inflow path 12c) and the secondary flow path (outflow path 12d) and the extending direction of the valve shaft 7.

Figure 9:
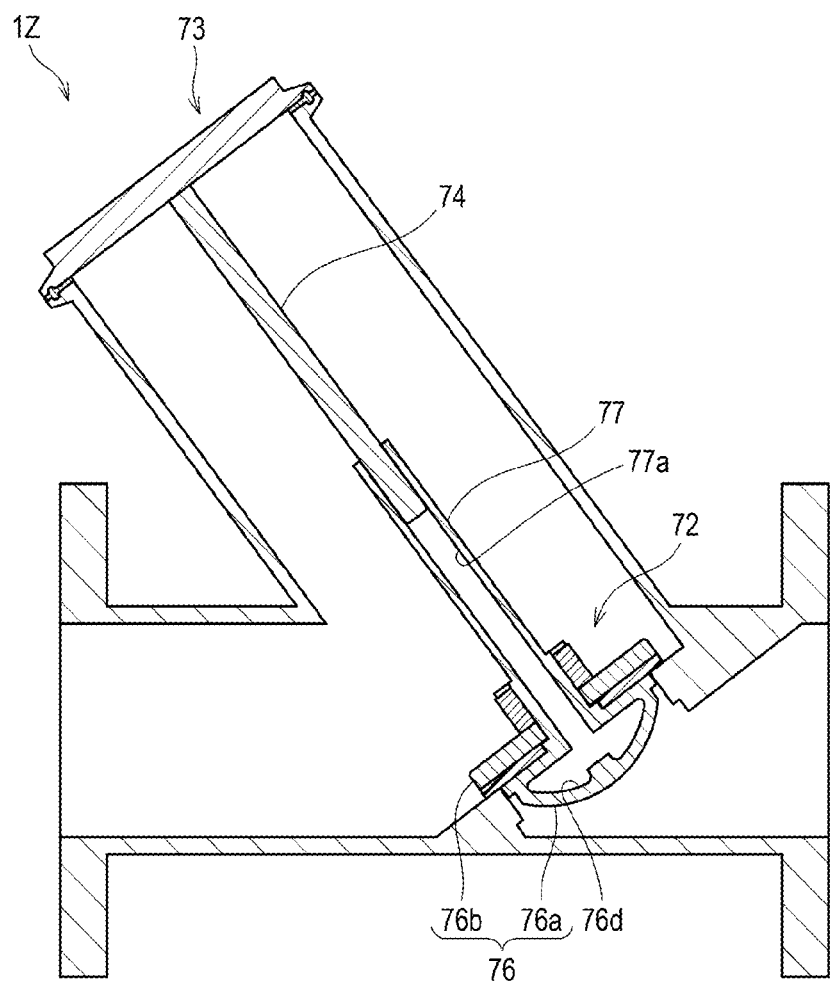
FIG. 9 is a schematic longitudinal cross-sectional view showing a closed state of a check valve according to a fourth embodiment.

A downstream-side protruding part 12f that protrudes toward the center line CL is provided in the lower portion of the inner wall surface that forms a secondary flow path (outflow path 12d) on the downstream side of the valve seat 12a. Here, "protruding toward the center line CL side" refers to protruding more toward the center line CL side than the main wall surface of the inner wall surface 12d-A of the joint part 9 (the inner wall surface linearly continuous from the collar parts 13 and 14). That is, as shown in FIG. 9, though the downstream-side protruding part is formed continuously from the valve seat, it protrudes (from the main wall surface).

In this embodiment, the downstream-side protruding part 12f shown in FIG. 2 has a configuration such that the joint part 9 that defines the outflow path 12d has a thicker portion in the lower portion, and the inner wall surface of thicker portion protrudes toward the center line CL.

Then, the amount of protrusion of the downstream-side protruding part 12f gradually decreases toward the downstream side.

The downstream-side protruding part 12f includes a protrusion peak 12f-A; and a protruding foot 12f-B. The connection flow pass obliquely intersects with the valve casing 12 at an intersect 12j. The intersect 12j includes a most downstream intersect portion 12j-A which hypothetically contacts a hypothetical surface HS extending perpendicular to the center line CL.

In other words, the flow path cross-sectional area on the downstream side of the valve seat 12a does not locally and sharply change. In the check valve 1 according to this embodiment, among the portions forming the outflow path 12d, the downstream-side protruding part 12f less protrudes toward the center line CL side of the flow path than the portion close to the center line CL side in the valve seat 12a, and is on extension of this portion in the valve seat 12a. Then, the downstream-side protruding part 12f protrudes toward the inner side of the flow path such that it defines the downstream-side outer periphery of the annular groove 12h, and then it gradually spreads toward the outer peripheral surface side as it further comes toward the downstream side.

For example, in the check valve shown in FIG. 2 and so forth of the specification of US Patent Application Publication No. 2005/0062000, the flow path cross-sectional area on the downstream side of the valve seat sharply expands. Therefore, a vortex is generated due to the difference in the dynamic pressure of the fluid flowing into the expanded portion on the downstream side.

In this embodiment, the flow path cross-sectional area of the outflow path 12d in the vicinity of the valve seat 12a is constant or gradually changes toward the downstream side. This can reduce the vortex generation due to the rapid expansion of the flow path cross-sectional area on the secondary side beyond the valve seat 12a.

In addition, an upstream-side protruding part 12i that protrudes toward the center line side is provided in an upper portion of the inner wall surface that forms the primary flow path (inflow path 12c) on the upstream side of the valve seat 12a.

More specifically, the upstream-side protruding part 12i protrudes obliquely downward toward the downstream side.

Then, the amount of protrusion of the upstream-side protruding part 12i gradually increases toward the downstream side.

For example, in the check valve shown in FIG. 2 and so forth of the specification of US Patent Application Publication No. 2005/0062000, the upstream-side protruding part 12i of this embodiment is not provided on the upstream side of the valve seat, and the primary flow path is directed obliquely upward. Therefore, the fluid flowing toward the downstream side through the opening of the valve body meanders significantly.

On the other hand, in this embodiment, a part of the fluid flowing in from the inflow path 12c comes into contact with the upstream-side protruding part 12i, so that the upstream-side protruding part 12i can form an obliquely downward flow. This enables the fluid that needs to be directed obliquely upward to push up the valve body 6 by the opening of the valve seat 12a part to flow linearly through the inflow path 12c and the outflow path 12d, and this can reduce the pressure loss.

The upstream-side protruding part 12i does not protrude up to the center line CL. For example, in the longitudinal cross section shown in FIG. 3, the upstream-side protruding part 12i according to this embodiment protrudes from the upper wall surface by ⅓ (including approximately ⅓) of the inflow side flow path width.

According to the above configuration, as shown in FIG. 4, a part of the fluid can easily flow linearly from the inflow path 12c along the center line CL, and the pressure loss can be reduced.

(About Moving Body)

The moving body 2 reciprocates inside the valve casing 12 to move the valve body 6 close to and away from the valve seat 12a between the primary flow path and the secondary flow path. Thereby, the moving body 2 prevents the backflow while adjusting the opening amount of the valve body 6 according to the flow rate.

The moving body 2 is mainly configured with a valve shaft 7, a valve body 6, and a water stop part (packing 8). The valve shaft 7 extends in the reciprocation direction. The valve body 6 is provided at the lower side end of the valve shaft 7. The water stop portion (packing 8) is attached to the valve body 6 that is in contact with the valve seat 12a in the closed state.

As shown in FIG. 3, the valve shaft 7 is accommodated in the guide tube 4 described below to reciprocate the moving body 2 so that the moving body 2 does not deviate in the direction perpendicular to the axial direction of the valve shaft 7. The valve shaft 7 is formed in a rod shape and continuously extends from the central portion of the upper surface of the valve body 6.

The valve body 6 and the valve shaft 7 are made of stainless steel, but may be made of a corrosion-resistant synthetic resin material such as polyvinyl chloride. In the closed state shown in FIG. 2 and the open state shown in FIG. 3, the spring body 20 mounted around the valve shaft 7 elastically biases the upper surface of the valve body 6 (valve body upper part 6b).

The valve body 6 includes a valve body lower part 6a and a valve body upper part 6b.

The valve body upper part 6b extends in a direction intersecting with the flow path direction of the inflow path 12c and the outflow path 12d and the extending direction of the valve shaft 7 and the valve casing 12.

The valve body upper part 6b has a collar 6c that is larger in the radial direction than the valve body lower part 6a with the valve shaft 7 in the center. In this embodiment, the end of the valve body upper part 6b itself is the collar 6c.

The lower end of the collar 6c is below the center line CL in the closed state shown in FIG. 2, and moves to a position above the center line CL at a certain position in the open state shown in FIG. 3.

According to the above configuration, the collar 6c moves to a position above the center line CL when the position changes from the closed state to a certain position in the open state. As a result, the amount of fluid that flows linearly can be increased.

In this embodiment, the lower end of the packing 8 described below is located below the lower end of the collar 6c.

However, there may be a configuration such that the diameter of the collar 6c is larger than that of the packing 8, or the valve casing 12 is more inclined, and thereby the lower end of the collar 6c is located below the lower end of the packing 8.

In this case, if the lower end of the collar 6c is configured to move to a position above the center line CL at a certain position in the open state, the lower end of the packing 8 also moves to a position above the center line CL. As a result, the amount of fluid that linearly flows through the check valve 1 can be increased.

Further, when the moving body 2 reciprocates, the valve body upper part 6b is in sliding contact with the inner wall 12b of the valve casing 12 to have a function of guiding the movement of the moving body 2, so that the lower end side of the moving body 2 does not deviate in the direction perpendicular to the axial direction of the valve shaft 7.

That is, the end of the valve body upper part 6b on the side of the inflow path 12c is arranged to be capable of sliding contact with the inner wall 12b of the valve casing 12 when the valve body 6 is opened.

The inner wall 12b of the valve casing 12 with which the valve body upper part 6b is in sliding contact is not limited to the flat one, and also includes the one having a rib-shaped one such as a guide rib 12g protruding from the surroundings, which is added thereon, in a part of the inner wall 12b.

In this embodiment, the valve body upper part 6b is arranged to be capable of sliding contact with the four guide ribs 12g that protrude into the valve casing 12 and extend along the longitudinal direction of the valve casing 12.

According to the above configuration, the end of the valve body upper part 6b on the side of the inflow path 12c is arranged to be capable of sliding contact with the inner wall 12b of the valve casing 12. Thereby, the deviation of the valve body upper part 6b can be reduced by the valve casing 12.

Further, the valve body upper part 6b is pushed by a nut 11 on the upper surface to have a function as a washer that evenly supports the packing 8 in the plane direction between the valve body lower part 6a. An insertion hole 6g through which the valve shaft 7 is inserted is formed at the center of the valve body upper part 6b, and penetrates in the thickness direction of the valve body upper part 6b.

The valve body lower part 6a includes a planar upper surface having the valve shaft 7 continuously formed in the central portion thereof and the other surface having a partial spherical shape.

More specifically, the valve body lower part 6a has a partial spherical surface on the outer surface facing the flow path. In particular, as shown in FIG. 4, the partial spherical surface of the valve body lower part 6a is disposed at a position where the fluid flowing linearly in the flow path direction from the inflow path 12c comes into contact with the partial spherical surface.

Also after the fluid flowing from the inflow path 12c comes into contact with the valve body 6 (valve body lower part 6a) to push up the moving body 2 (valve body 6) upward from the valve seat 12a, the fluid flows through the check valve 1 while the fluid is in contact with the partial spherical surface side of the valve body lower part 6a. This allows the valve body 6 to less obstruct the flow of the fluid, and the velocity of the fluid to be less reduced. Therefore, the fluid can pass therethrough with a low head loss (friction resistance).

The lower portion of the valve shaft 7 and the valve body lower part 6a, and the valve body upper part 6b are configured by assembling separate members.

However, the configuration is not limited to this. If the packing 8 is flexible and can be attached to the valve body 6 by deforming the packing 8, the valve body lower part 6a and the valve body upper part 6b do not necessarily have to be configured with separate members.

The water stop part (packing 8) is a member that is pressed by the valve body 6 (valve body upper part 6b) and the valve seat 12a in the closed state of the check valve 1 to stop water at the valve seat 12a, and is disposed between the valve body lower part 6a and the valve body upper part 6b (collar 6c). The packing 8 is formed in an annular shape having a central hole penetrating through the thickness direction. Specifically, the packing 8 has the central hole passed through the valve shaft 7, and is disposed between the valve body lower part 6a and the valve body upper part 6b.

A part of the packing 8 is below the center line CL when it is in the closed state shown in FIG. 2, and the entire packing 8 moves above the center line CL at a certain position in the open state shown in FIG. 3.

According to the above configuration, change from the closed state to a certain position in the open state allows the packing 8 to less obstruct the flow passing through the center line CL to reduce the pressure loss.

The above "a certain position in the open state" is preferably a position where the valve body 6 is in an open state at a standard flow rate.

For example, this position is a position in which the check valve 1 (valve body 6) is open at 70% with respect to the fully open state (70% of the maximum opening degree of the check valve 1).

Such a configuration allows the packing 8 at a standard flow rate to less obstruct the flow in the vicinity of the center line CL at which the flow speed is the fastest to prevent the pressure loss from increasing.

The check valve 1 further includes the nut 11 that presses the valve body upper part 6b from the other side (upper side) toward the valve body lower part 6a side. The nut 11 has an elastically deformable friction ring to have a loosening prevention function. Here, the nut 11 only needs to have a loosening prevention function and is not limited to the one having a friction ring. For example, it may be configured with a double nut (not shown in the drawings). Specifically, one of the double nuts may have a wedge-shaped projection, and the other nut may be formed with a groove having a corresponding shape to receive the projection.

(About Guide Cap)

As shown in FIG. 2, the guide cap 3 is removably attached to the valve casing 12 to seal the upper side of the valve body 6 and to guide the reciprocating movement of the moving body 2. The guide cap 3 is configured with a guide tube 4 and a disk-shaped top plate part 5 integrally formed on the upper end of the guide tube 4.

The top plate part 5 has a ferrule flange 5e shown in FIG. 2 at its edge and is removably fastened to the ferrule flange 5e by a ferrule joint (not shown in the drawings) such that the gasket 16 is sandwiched between the ferrule flange 12e formed on the upper end of the valve casing 12.

A guide tube 4 is provided obliquely downward (on the primary flow path side) substantially at the center of the top plate part 5.

The guide tube 4 guides the sliding of the valve shaft 7 of the valve body 6 on its inner surface, extends from the top plate part 5 obliquely downward to the valve seat 12a side to guide the valve shaft 7 connected to the valve body 6 to enable the valve body 6 to reciprocate.

<Dynamic Pressure Distribution>

Next, a dynamic pressure distribution based on a fluid analysis assuming that a fluid (water) flows through the check valve 1 is described below with reference to FIG. 5. FIG. 5 is an explanatory diagram showing a dynamic pressure distribution in the flow path when a fluid is caused to flow through the check valve 1 according to the first embodiment, and showing the flow of fluid and dynamic pressure distribution at a flow velocity of about 4 m/s on the inflow side and a flow rate of about 4800 L/min (valve opening degree: 50%). Here, in FIG. 5, the darker the color (the higher the dot density), the higher the dynamic pressure.

As shown in FIG. 5, through the flow path including where the fluid passes between the valve seat 12a and the valve body 6, the main flow with high dynamic pressure (dynamic pressure DP1) extends substantially parallel to the flow path direction without going to the bottom side of the flow path. Further, it can be seen that the vortex W induced by the main flow does not encroach to the center side of the flow path, and its range is small. Therefore, the diffusion and separation of the fluid was small, the head loss was about 2.8 m, and the pressure loss can be reduced to a small level.

Second Embodiment

Figure 6:
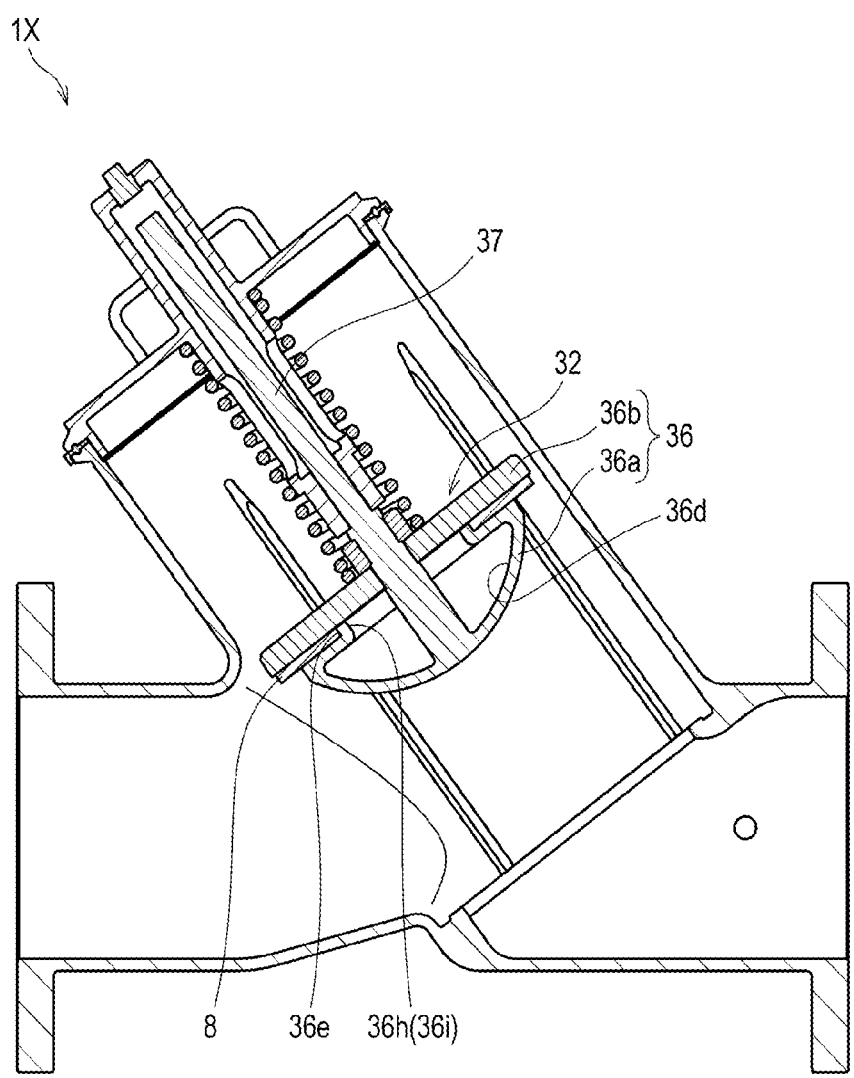
FIG. 6 is a longitudinal cross-sectional view showing an open state of a check valve according to a second embodiment.

Next, a check valve 1X according to a second embodiment is described below mainly with reference to FIG. 6. The check valve 1X is installed to a pipe having a larger diameter than the check valve 1. FIG. 6 is a longitudinal cross-sectional view showing an open state of the check valve 1X according to the second embodiment.

Note that regarding the check valve 1X, the description of the configuration common to the check valve 1 according to the first embodiment will not be repeated.

The check valve 1x according to this embodiment includes a moving body 32. The moving body 32 includes a valve shaft 37 and a valve body 36 integrally formed with a lower end of the valve shaft 37. The valve body 36 includes a valve body lower part 36a and a valve body upper part 36b.

The valve body lower part 36a is formed in a partial spherical shape having a hollow part 36d.

More specifically, the valve body lower part 36a has a partial spherical surface on the outer surface on the side facing the flow path, and has a shape symmetrical with respect to the center line CL, and is disposed inside the check valve 1X.

According to the above configuration, the valve body lower part 36a has the hollow part 36d, which favorably improves the responsiveness to changes in the flow rate. At the same time, it is formed in a partial spherical shape, which can reduce the flow resistance and the pressure loss.

The valve body lower part 36a include a small diameter part 36h having an annular shape at a portion in contact with the valve body upper part 36b.

An opening 36i connected to the hollow part 36d is formed in the small diameter part 36h.

The packing 8 is fitted in a recess 36e formed outside the outer periphery of the small diameter part 36h, and between the valve body upper part 36b and the valve body lower part 36a.

More specifically, the recess 36e is formed by overlapping of a lower surface of the valve body upper part 36b and a portion having an L-shaped cross section.

The L-shaped cross section is formed by a part of the upper surface of the valve body lower part 36a, in which the part of the upper surface is continuous from the peripheral surface of the small diameter part 36h.

In the direction perpendicular to the axial direction of the valve shaft 37, the maximum diameter of the hollow part 36d is formed to be larger than that of the opening 36i.

The hollow part 36d is formed in the valve body lower part 36a, so that the weight of the moving body 32 can be reduced. The valve body 36 including the hollow part 36d is formed in mirror symmetry with respect to an imaginary plane that includes the axial directions of the flow path direction and the valve shaft 37 therein. With this formation, when the fluid flows in the flow path direction, it is possible to prevent the valve body 36 from being deviated by the force applied from the fluid to the valve body 36, and to stabilize the flow of the fluid.

Third Embodiment

Figure 7:
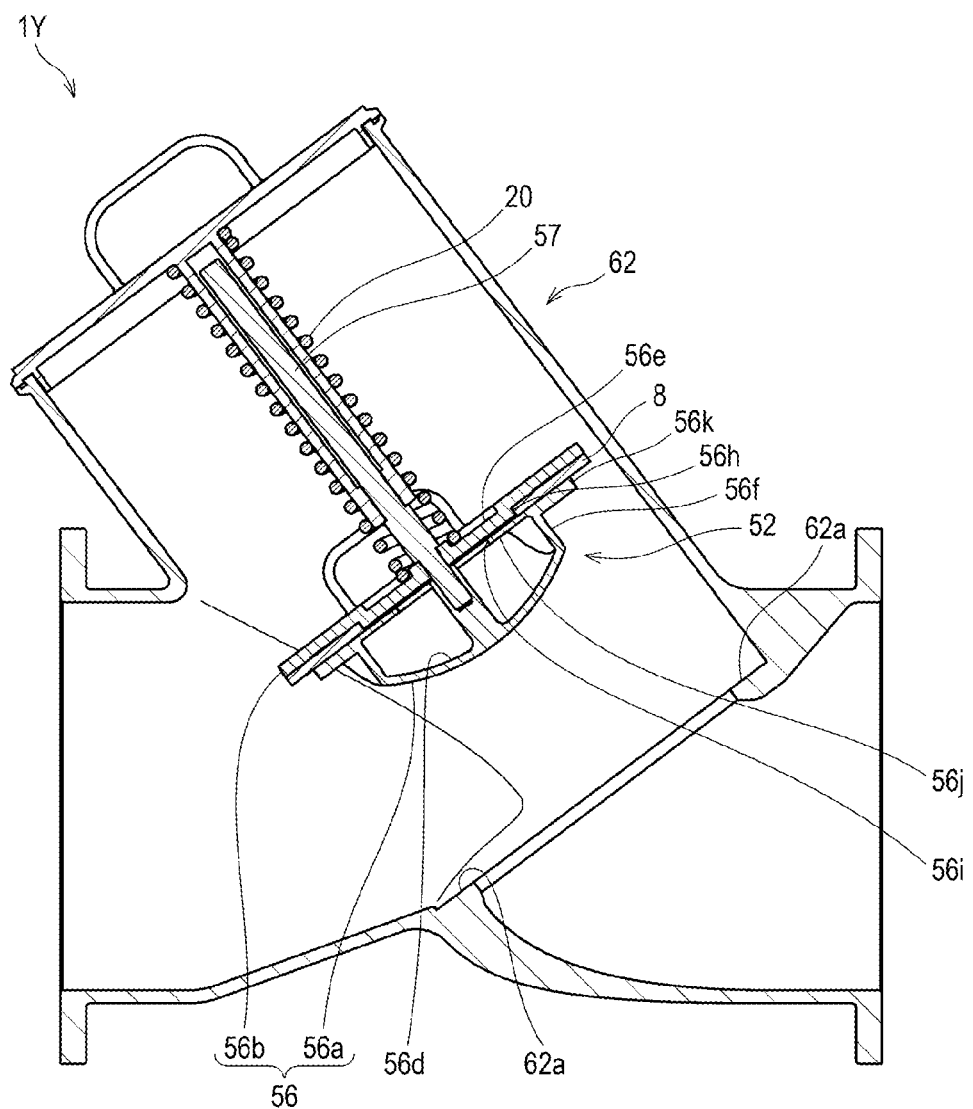
FIG. 7 is a longitudinal cross-sectional view showing an open state of a check valve according to a third embodiment.
Figure 8:
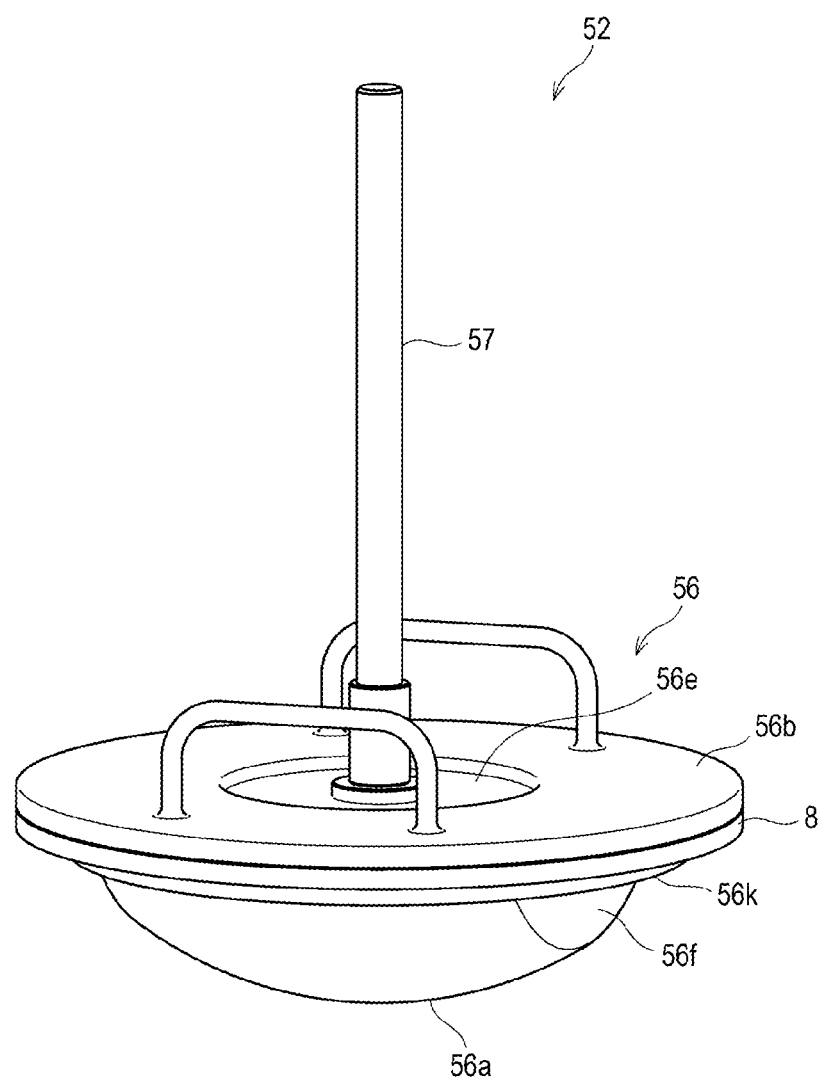
FIG. 8 is a perspective view showing a moving body according to the third embodiment.

Next, the check valve 1Y according to a third embodiment is described below mainly with reference to FIGS. 7 and 8. FIG. 7 is a longitudinal cross-sectional view showing an open state of the check valve 1Y according to the third embodiment, and FIG. 8 is a perspective view showing a moving body 52 according to the third embodiment.

Note that, in the check valve 1Y, the description of the configuration common to the check valve 1 according to the first embodiment or the check valve 1X according to the second embodiment will not be repeated. For example, the guide cap according to the check valve 1Y is common to that of the first and second embodiments except for the size, so the description thereof will not be repeated.

The check valve 1Y mainly includes a moving body 52 and a valve casing 62 that houses the moving body 52. The moving body 52 is mainly configured with a round rod-shaped valve shaft 57 extending in the reciprocation direction, a valve body 56 provided at a lower side end of the valve shaft 57, and a packing 8 attached to the valve body 56.

The valve body 56 is configured with a valve body lower part 56a integrally formed at the lower side (primary flow path side) end of the valve shaft 57 and a valve body upper part 56b mounted on the valve body lower part 56a.

The valve body lower part 56a has an outer surface formed in a partial spherical surface, and has two flat surface parts 56f at positions apart by 180 degrees from each other with the axial in the center. The two flat surface parts 56f rise in parallel to reciprocating direction of the moving body 52, and extends parallel to each other.

The two flat surface parts 56f provided can increase the area of an edge part 56k described below as compared with that without the flat surface parts 56f. This can increase the load of the fluid that pushes up the valve body 56 as compared with that of the fluid that pushes up the spherical part, and can make the beginning of the flow of fluid smooth.

Further, a female screw part is formed at the center of the valve body lower part 56a, and is threadedly engaged with a male screw part formed at the lower end of the valve shaft 57.

As shown in FIG. 7, in the initial state, even if the flat surface part 56f is inclined with respect to the flow path direction, the valve body 56 rotates together with the valve shaft when the fluid flows into the check valve 1Y and pushes the moving body 52 upward to flow to the downstream side.

In other words, the flat surface part 56f receives the dynamic pressure of the fluid, and the posture of the moving body 52 is automatically adjusted into the direction parallel to the flow path direction. In this way, the pressure loss of the valve body 56 is reduced.

The valve body lower part 56a has a facing part 56j and an edge part 56k. The facing part 56j is formed at a position where a part of the facing part 56j faces a small diameter part 56h of the valve body upper part 56b. The edge part 56k is formed radially outward of the facing part 56j and clamps a packing 8 between the valve body lower part 56a and the valve body upper part 56b.

Further, a hollow part 56d and an opening 56i that is connected to the hollow part 56d and faces the valve body upper part 56b are formed in the valve body lower part 56a.

The facing part 56j defines the upper portion of the hollow part 56d on the radially outward of the valve body lower part 56a. The above opening 56i is formed in the central part in the radial direction of the facing part 56j.

The edge part 56k has a function of clamping the packing 8 between the edge part 56k and the valve body upper part 56b, and is formed thicker than the facing part 56j. In this way, the edge part 56k is formed thicker than the facing part 56j. This can increase the volume of the hollow part 56d while stably holding the packing 8 to which a repeated impact load is applied from the valve seat 62a provided in the valve casing 62 by repeated opening and closing of the valve body 56.

As shown in FIG. 8, a spring seat surface 56e recessed downward (primary flow path side) from a radially outward portion is formed on a radially inward portion in the other side surface (upper surface) of the valve body upper part 56b.

Fourth Embodiment

Next, a check valve 1Z according to a fourth embodiment is described mainly with reference to FIG. 9. FIG. 9 is a schematic longitudinal cross-sectional view showing a closed state of the check valve 1Z according to the fourth embodiment. Here, in FIG. 9, the spring body 20 is not shown.

The valve shaft 77 included in the check valve 1Z according to this embodiment has a hollow space 77a and is formed in a tubular shape. The valve shaft 77 is guided by a guide rod 74 inserted into a hollow space 77a in the valve shaft 77 to be capable of reciprocating. That is, the valve shaft 77 slides on the outer surface of the guide rod 74 with the inner surface facing the hollow space 77a to be guided in the reciprocating direction by the guide rod 74.

According to the above configuration, the valve shaft 77 is guided by the guide rod 74, so that a valve body 76 connected to the valve shaft 77 is guided in the reciprocating direction.

In particular, a hollow part 76d that is continuous with the hollow space 77a of the valve shaft 77 is formed inside the valve body 76 according to this embodiment.

According to the above configuration, the hollow space 77a of the valve shaft 77 and the hollow part 76d of the valve body 76 are continuously formed, so that the moving body 72 including the valve shaft 77 and the valve body 76 can be reduced in weight, and the responsiveness to changes in the flow rate can be improved.

Although the respective embodiments have been described above with reference to the drawings, these are merely examples of the present invention, and various configurations other than the above may be employed.

The check valve of the present invention and the various components of the reciprocating member configuring the check valve need not be independent of each other. There may be allowable cases such that a plurality of components is formed as a single member, one component is formed out of a plurality of members, one component is a part of another component, or a part of one component overlaps with a part of another component.

This embodiment includes the following technical ideas.
(1) A check valve of straight pipe joint type and oblique lift type, the check valve including:
  a valve seat;
  a moving body capable of linearly reciprocating between a closed state in which the moving body is in close contact with the valve seat and an open state in which the moving body is separated from the valve seat;
  a primary flow path located on an upstream side of the moving body; and
  a secondary flow path located on a downstream side of the moving body, wherein
  the moving body includes
    a valve body supported by the valve seat in the closed state, and
    a valve shaft extending from the valve body, and
  the valve seat is formed to straddle the center line of the connection flow path that linearly extends including the primary flow path and the secondary flow path in a cross section including the center line thereon.
(2) The check valve according to (1), wherein
  the moving body further includes a water stop part that is in contact with the valve seat in the closed state, and
  a part of the water stop part is located below the center line in the closed state, and the entire water stop part moves to a position above the center line at a certain position in the open state.
(3) The check valve according to (1) or (2) wherein
  the valve body includes a valve body lower part and a valve body upper part,
  the valve body upper part has a collar that is larger in a radial direction than the valve body lower part, with the valve shaft in the center, and
  the lower end of the collar is located below the center line in the closed state and moves to a position above the center line at a certain position in the open state.
(4) The check valve according to (2) or (3), wherein a certain position in the open state is a position of 70% with respect to the fully open state.
(5) The check valve according to (3), wherein the valve body lower part is formed in a partial spherical shape having a hollow part.
(6) The check valve according to any one of (1) to (5), wherein
  a downstream-side protruding part that protrudes toward the center line side is provided in a lower portion of the inner wall surface that forms the secondary flow path on the downstream side of the valve seat, and
  an amount of protrusion of the downstream-side protruding part gradually decreases toward the downstream side.
(7) The check valve according to any one of (1) to (6), wherein
  an upstream-side protruding part that protrudes toward the center line side is provided on an upper portion of the inner wall surface that forms the primary flow path on the upstream side of the valve seat, and
  an amount of protrusion of the upstream-side protruding part gradually increases toward the downstream side.
(8) The check valve according to (7), wherein the upstream-side protruding part protrudes less than the center line.
(9) The check valve according to any one of (1) to (8), wherein
  the check valve further includes a valve casing for accommodating at least a part of the moving body on the opposite side to the valve body,
  the valve body includes a valve body lower part and a valve body upper part,
  the valve shaft and the valve casing extend obliquely toward a side of the secondary flow path in a direction intersecting with a flow path direction of the primary flow path and the secondary flow path,
  the valve seat and the valve body upper part extend in a direction intersecting with the flow path direction of the primary flow path and the secondary flow path, and the extending direction of the valve shaft and the valve casing, and
  an end of a side of the primary flow path in the valve body upper part is arranged to be capable of sliding contact with the inner wall of the valve casing when the valve body is opened.
(10) The check valve according to any one of (1) to (9), wherein
  the valve shaft has a hollow space, is formed in a tubular shape, and is guided to be capable of reciprocating by a guide rod inserted into the hollow space in the valve shaft.
(11) The check valve according to (10), wherein a hollow part continuous with the hollow space of the valve shaft is formed in the valve body.

REFERENCE SIGNS LIST 1, 1X, 1Y, 1Z check valve
2 moving body
3 guide cap (cap)
4 guide tube
5 top plate part
  5e ferrule flange
6 valve body
  6a valve body lower part
  6b valve body upper part
  6c collar
  6g insertion hole
7 valve shaft
8 packing (water stop portion)

9 joint part
11 nut
12 valve casing
  12a valve seat
  12b inner wall
  12c inflow path (primary flow path)
  12d outflow path (secondary flow path)
  12e ferrule flange
  12f downstream-side protruding part
  12g guide ribs
  12h annular groove
  12i upstream-side protruding part
13, 14 collar part
15 mount
  15a opening for decompression
16 gasket
20 spring body
32 moving body
  36 valve body
  36a valve body lower part
  36b valve body upper part
  36d hollow part
  36e recess
  36h small diameter part
  36i opening
  37 valve shaft
52 moving body
  56 valve body
  56a valve body lower part
  56b valve body upper part
  56d hollow part
  56e spring seat surface
  56f flat surface part
  56h small diameter part
  56i opening
  56j facing part
  56k edge part
  57 valve shaft
62 valve casing
  62a valve seat
72 moving body
  73 guide cap
  74 guide rod
  76 valve body
  76a valve body lower part
  76b valve body upper part
  76d hollow part
  77 valve shaft
  77a hollow space
CL center line
DP1 dynamic pressure
W vortex

The invention claimed is:

1. A check valve of straight pipe joint type and oblique lift type, the check valve comprising:
  a valve casing having an inner wall therein;
  a valve seat accommodated in the valve casing;
  a moving body accommodated in the valve casing, the moving body capable of linearly reciprocating between a closed state in which the moving body is in close contact with the valve seat and an open state in which the moving body is separated from the valve seat;
  a connection flow path extending straight having a center line, the connection flow path comprising:
    a primary flow path located on an upstream side of the valve seat; and
    a secondary flow path located on a downstream side of the valve seat,
  wherein the moving body includes:
    a valve body supported by the valve seat in the closed state, and
    a valve shaft extending from the valve body; and
  wherein the valve seat is formed to straddle the center line of the connection flow path in a cross section including the center line,
  wherein the secondary flow path comprises an inner wall surface thereof which has a downstream-side protruding part protruded toward the center line, the downstream-side protruding part comprising:
    a protrusion peak; and
    a protruding foot at a downstream side of the protrusion peak;
  wherein the connection flow pass obliquely intersects with the valve casing at an intersect, wherein the intersect comprises a most downstream intersect portion which hypothetically contacts a hypothetical surface extending perpendicular to the center line,
  wherein the protrusion peak is located at an upstream side of the hypothetical surface,
  wherein the protruding foot is located at a downstream side of the hypothetical surface.

2. The check valve according to claim 1, wherein
  the moving body further comprises a water stop part that is in contact with the valve seat in the closed state, and
  a part of the water stop part is located below the center line in the closed state, and the entire water stop part moves to a position above the center line at a certain position in the open state.

3. The check valve according to claim 2, wherein a certain position in the open state is a position of 70% with respect to the fully open state.

4. The check valve according to claim 1, wherein
  the valve body comprises a valve body lower part and a valve body upper part,
  the valve body upper part has a collar that is larger in a radial direction than the valve body lower part, with the valve shaft in the center, and
  the lower end of the collar is located below the center line in the closed state and moves to a position above the center line at a certain position in the open state.

5. The check valve according to claim 4, wherein the valve body lower part is formed in a partial spherical shape having a hollow part.

6. The check valve according to claim 1, wherein
  the downstream-side protruding part is provided in a lower portion of the inner wall surface, and
  an amount of protrusion of the downstream-side protruding part gradually decreases toward the downstream side.

7. The check valve according to claim 1, wherein
  an upstream-side protruding part that protrudes toward the center line is provided on an upper portion of an inner wall surface that forms the primary flow path on the upstream side of the valve seat, and
  an amount of protrusion of the upstream-side protruding part gradually increases toward the downstream side.

8. The check valve according to claim 7, wherein the upstream-side protruding part protrudes less than the center line.

9. The check valve according to claim 1, wherein
  the check valve further comprises a valve casing for accommodating at least a part of the moving body on the opposite side to the valve body, the valve body includes a valve body lower part and a valve body upper part, the valve shaft and the valve casing extend obliquely toward a side of the secondary flow path in a direction intersecting with a flow path direction of the primary flow path and the secondary flow path, the valve seat and the valve body upper part extend in a direction intersecting with the flow path direction of the primary flow path and the secondary flow path, and an extending direction of the valve shaft and the valve casing, and an end of the valve body upper part on a side of the primary flow path in a direction of the connection flow path is arranged to be capable of sliding contact with an inner wall of the valve casing when the valve body is opened.

10. The check valve according to claim 1, wherein the valve body includes a valve body lower part and a valve body upper part, the valve body lower part has a flat surface part in parallel to reciprocating direction of the moving body.

\* \* \* \* \*